(12) United States Patent
Anegawa et al.

(10) Patent No.: US 6,658,078 B2
(45) Date of Patent: Dec. 2, 2003

(54) MOX NUCLEAR FUEL ASSEMBLY EMPLOYABLE FOR A THERMAL NEUTRON NUCLEAR REACTOR

(75) Inventors: Takafumi Anegawa, Tokyo (JP); Shin Takizawa, Tokyo (JP); Shinya Mizokami, Tokyo (JP)

(73) Assignee: Tokyo Electric Power Co., Tokyo (JP)

( * ) Notice: Subject to any disclaimer, the term of this patent is extended or adjusted under 35 U.S.C. 154(b) by 0 days.

(21) Appl. No.: 10/066,744

(22) Filed: Feb. 6, 2002

(65) Prior Publication Data

US 2003/0026380 A1 Feb. 6, 2003

(51) Int. Cl.⁷ .................................................. G21C 7/00
(52) U.S. Cl. ...................... 376/435; 376/434; 376/409; 376/419
(58) Field of Search ................................ 376/435, 419, 376/267

(56) References Cited

U.S. PATENT DOCUMENTS 3,802,995 A  *  4/1974  Fritz et al. ..................... 176/76
3,933,582 A  *  1/1976  MacNabb ..................... 176/78
4,018,697 A  *  4/1977  Smith .................. 252/301.1 R
5,089,210 A  *  2/1992  Reese et al. ................. 376/212
5,410,580 A  *  4/1995  Seino .......................... 376/435
5,872,826 A  *  2/1999  Fujieda et al. ............... 376/447
6,002,735 A  * 12/1999  Van Swam .................. 376/435

FOREIGN PATENT DOCUMENTS

| JP | H2-44288   | * | 2/1990 |
| JP | 4-50795    | * | 2/1992 |
| JP | 0473334 A1 | * | 3/1992 |
| JP | 4-109193   | * | 4/1992 |

* cited by examiner

Primary Examiner—Charles T. Jordan
Assistant Examiner—R Palabrica
(74) Attorney, Agent, or Firm—Oliff & Berridge, PLC

(57) ABSTRACT

A MOX nuclear fuel assembly employable either for a thermal neutron reactor employing $UO_2$ as the nuclear fuel and light water as the moderator/coolant or for a thermal neutron reactor employing the MOX fuels as the nuclear fuel and light water as the moderator/coolant is provided with only one kind of MOX nuclear fuel rods each of which has relatively large magnitude of the enrichment grade of the fissionable Pu-s or $Pu^{239}$ and $Pu^{241}$, the quantity of the MOX nuclear fuel rods being relatively small.

20 Claims, 6 Drawing Sheets ured fuel assembly and to
MOX NUCLEAR FUEL ASSEMBLY EMPLOYABLE FOR A THERMAL NEUTRON NUCLEAR REACTOR This invention relates to an improvement applicable to a nuclear fuel assembly employable either for a thermal neutron reactor employing $UO_2$ as the nuclear fuel and light water as the moderator/coolant or for a thermal neutron reactor employing a mixture of $PuO_2$ and $UO_2$ (Hereinafter referred to as a MOX nuclear fuel standing for a mixed oxide nuclear fuel) as the nuclear fuel and light water as the moderator/coolant. More specifically, this invention relates to an improvement brought out for the purpose to reduce the production cost of the MOX nuclear fuel assembly and to increase the value of the spent fuel of the MOX nuclear fuel assembly.

BACKGROUND OF THE INVENTION

Nuclear reactors available in the prior art are predominantly thermal neutron reactors wherein the nuclear fuel is a plurality of enriched $UO_{02}$ pellets containing fissionable $U^{235}$ more than the natural U and the moderator/coolant is light water. In order to prevent chemical reaction from occurring between the $UO_{02}$ pellets and light water, disc shaped $UO_2$ pellets having an approximate diameter of 1 cm and an approximate height of 1 cm are piled in a tube made of a zircaloy sheath, the zircaloy tube confining plural shaped $UO_2$ pellets being called a nuclear fuel rod. Along the external surface of the nuclear fuel rods, water is allowed to flow for the purpose to act as the moderator/coolant. A light water reactor having a capacity of e.g. 1,100 MW has as many as 50,000 nuclear fuel rods arranged in the reactor core cavity having a diameter of approximately 5 m in parallel one another, remaining space for allowing water to flow between each nuclear fuel rod. Since the quantity of the nuclear fuel rods is so many, it is inconvenient to treat them as a whole. Thus, a concept of grouping some quantity of the nuclear fuel rods, e.g., 60 through 100 nuclear fuel rods, was brought out and the group of nuclear fuel rods was defined as a nuclear fuel assembly. A light water reactor having a capacity of e.g. 1,100 MW has approximately 760 nuclear fuel assemblies. Plural spaces remain between the nuclear fuel rods for allowing water to flow in the nuclear fuel assemblies and for allowing control rods, e.g., boron rods and the like, to be arranged in the nuclear fuel assemblies.

Requirements for the foregoing nuclear fuel assembly are tabulated below.

1. The burn-up of a nuclear fuel assembly is required to be sufficiently large e.g. 40 through 55 GWd/ton during the actual lifetime of 4 through 5 years.
2. The distribution of volumetric power density or actually the heat distribution in the reactor core is required to be uniform for the entire space of each nuclear fuel assembly and resultantly for the entire space of the reactor core.
3. Each nuclear fuel assembly is required to be durable to safely confine the fission products within the nuclear fuel assembly.

Referring to a drawing, an exemplary arrangement of nuclear fuel rods in a nuclear fuel assembly designed to be employed for a thermal reactor employing $UO_2$ as the nuclear fuel and light water as the moderator/coolant, will be described below.

Referring to FIG. 1 illustrating a horizontal cross-section of a nuclear fuel assembly designed to be employed for a $UO_2$/light water reactor available in the prior art, symbols 1, 2, 3, 4 and 5 show 5 independent kinds of $UO_2$ nuclear fuel rods. Each kind of $UO_2$ nuclear fuel rods contains $UO_2$ nuclear fuel of which the enrichment grade is same to each other or the $UO_2$ nuclear fuel contained in a kind of $UO_2$ nuclear fuel rods has a single enrichment grade, although the enrichment grade is different for each kind. The enrichment grade is reduced from symbol 1 toward symbol 5. The quantities of symbols 1, 2, 3, 4 and 5 are 10, 30, 4, 24, and 4 respectively. Each of the $UO_2$ nuclear fuel rods is approximately 4 m in length and approximately 11 mm in the external diameter. The nuclear fuel assembly has a cross-section which is a square of which the length of each side is approximately 15 cm. Symbol W shows a water rod having sides of approximately 4 cm. As is shown in the drawing, $UO_2$ nuclear fuel rods having a higher enrichment grade are arranged generally at the center of the reactor core and those having less enrichment grades are arranged surrounding the symbol 1 to turn out the enrichment grade gradually less in the outer space.

The philosophy of the arrangement of nuclear fuel rods in the nuclear fuel assembly designed for a $UO_2$/light water reactor is summarized below.

1. Many kinds of $UO_2$ nuclear fuel rods, each kind being different in enrichment grade, are employed.
2. The enrichment grade of the $UO_2$ nuclear fuel contained in each kind of the $UO_2$ nuclear fuel rods is same and the enrichment grade is selected to meet the requirements to make the distribution of the volumetric power density or actually the heat distribution in the reactor, uniform for the entire space of each nuclear fuel assembly, and resultantly for the entire space of the reactor core. Specifically, the enrichment grade of each nuclear fuel rod is selected to be different from one another and is made higher at the center of the reactor core to be made gradually less at the outer space.

It is well known that $U^{235}$ contained in the $UO_2$ nuclear fuel contributes for generation of heat by fission and $U^{238}$ contained in the $UO_2$ nuclear fuel absorbs neutrons and transits itself to isotopes of a higher order or having a higher atomic number e.g. $Pu^{239}$, $Pu^{240}$, $Pu^{241}$ or $Pu^{242}$.

Since $Pu^{239}$ and $Pu^{241}$ alone are fissionable, they are employable for causing fission either in the reactor currently employed or in other reactors after $Pu^{239}$ and $Pu^{241}$ are recovered from the spent fuel thereof by a spent fuel reprocessing process.

A mixture of oxides of the foregoing isotopes of a higher order than $U^{235}$ or having a higher atomic number than U e.g. $Pu^{239}$, $Pu^{240}$, $Pu^{241}$ and $Pu^{242}$ and of oxides of U is called a MOX nuclear fuel standing for a mixed oxide nuclear fuel.

Following the foregoing background, brought out was a concept of a nuclear reactor which is allowed to employ either an oxide of $UO_2$ alone or a MOX nuclear fuel. A MOX nuclear fuel assembly produced from the MOX nuclear fuel is the object of this invention.

Referring to a drawing, an exemplary arrangement of nuclear fuel rods in a MOX nuclear fuel assembly designed to be employable for a thermal reactor which is allowed to employ either $UO_2$ alone or MOX nuclear fuel will be described below.

Referring to FIG. 2 illustrating a horizontal cross-section of a nuclear fuel assembly designed to be employable either for a $UO_2$/light water reactor available in the prior art or for a MOX nuclear fuel/light water reactor available in the prior art, symbols $P_1$, $P_2$, $P_3$ and $P_4$ show 4 independent kinds of MOX nuclear fuel rods. Each kind of MOX nuclear fuel rods contains fissionable Pu having a single enrichment grade or the same enrichment grade. The fissionable Pu enrichment grade differs from one to another for each kind of nuclear fuel rods and is reduced from symbol $P_1$ wherein the fissionable Pu enrichment grade is approximately 5% toward symbol $P_4$ wherein the fissionable Pu enrichment grade is much less. The quantity of MOX nuclear fuel rods represented by symbols $P_1$, $P_2$, $P_3$ and $P_4$ is 20, 17, 8 and 3 respectively. Each of the MOX nuclear fuel rods is approximately 4 m in length and approximately 12 mm in the external diameter. The nuclear fuel assembly has a cross-section which is square of which the length of each side is approximately 15 cm. Symbols $G_1$ and $G_2$ show gadolinium fuel rods. The quantity of the gadolinium fuel rods $G_1$ and $G_2$ is 4 and 8 respectively. Thus, the MOX nuclear fuel rods accounts for 80% of the total quantity of the nuclear fuel rods employed in the nuclear fuel assembly. The function of the gadolinium fuel rods is to restrict fission from occurring at the beginning of the reactor operation period. In other words, the gadolinium fuel rods are effective to reduce the possibility of occurring fission at the beginning of the reactor operation period but thereafter they lose such a function and transit themselves to fissionable fuels. In this sense, gadolinium fuel rods are included in the category of the nuclear fuel. Symbol W shows a water rod having sides of approximately 3 cm. As is shown in the drawing, the MOX fuel rods having a higher enrichment grade of the fissionable PU-s are arranged at the center of the reactor core and those having less enrichment grades of the fissionable PU-s are arranged surrounding the symbol $P_1$ to turn out the enrichment grade of the fissionable PU-s gradually less in the outer space. The average magnitude of the enrichment grade of the fissionable PU-s is approximately 3%. It is needless to emphasize that selection of $UO_2$ fuel alone, MOX nuclear fuel alone or a combination of $UO_2$ fuel and MOX nuclear fuel is allowed for a reactor which is designed to burn either $UO_2$ alone or MOX nuclear fuel.

As is clear from the foregoing description, the arrangement of the MOX nuclear fuel rods in the foregoing nuclear fuel assembly employable for a thermal reactor which is designed to allow burning either $UO_2$ alone or MOX nuclear fuel available in the prior art is a simple replacement of the $UO_2$ fuel rods with the MOX nuclear fuel rods applied to the foregoing nuclear fuel assembly employable for a thermal reactor which is designed to allow burning $UO_2$ alone or MOX nuclear fuel available in the prior art, without paying particular attention to the difference in nature of the $UO_2$ fuel and the MOX nuclear fuel. Needless to emphasize that As a result, the philosophy of the arrangement of the nuclear fuel rods in the nuclear fuel assembly employable either for a reactor designed to burn $UO_2$ fuel or for a reactor designed to burn MOX nuclear fuel available in the prior art can be summarized below.
1. Employed are many kinds of MOX nuclear fuel rods each of which kinds is different from one another in grade of fissionable Pu-s enrichment.
2. The magnitude of the fissionable Pu-s enrichment grade of the many kinds of the MOX nuclear fuel rods varies 6% or less. In other words, the enrichment grade is relatively less.
3. The ratio of the total quantity of the MOX nuclear fuel rods contained in an assembly and the entire quantity of the nuclear fuel rods contained in an assembly is as high as 80%.
4. Each kind of the MOX nuclear fuel rods is selected to meet the requirements to make the distribution of volumetric power density or actually the heat distribution in the reactor uniform for the entire space of each nuclear fuel assembly. Specifically, the enrichment grade of each MOX nuclear fuel rod is selected to be different from one another and is made higher at the center of the reactor core to be made gradually less at the outer space.

This philosophy is resultantly involved with the following drawbacks, predominantly caused by the difference in nature of $UO_2$ fuel and the MOX nuclear fuel, described below.
1. In the case of U, since the raw material of the $UO_2$ fuel or the natural U contains quite little quantity or 0.7% of the fissionable $U^{235}$, a process for obtaining U containing an appropriate quantity of fissionable $U^{235}$ (U having a larger enrichment grade than that of the raw material) or a process for enriching U requires a considerable amount of cost. Conversely, in the case of the MOX nuclear fuel, since the raw material or Pu-s recovered from the spent fuel by conducting a spent fuel reprocessing process contains a large quantity or 60 through 70% of the fissionable $Pu^{239}$ and $Pu^{241}$, a process for obtaining MOX nuclear fuel containing an appropriate quantity of $Pu^{239}$ and $Pu^{241}$ (MOX nuclear fuel having a smaller enrichment grade than that of the raw material) or a process for reducing the enrichment grade requires a considerable amount of cost. In other words, although in the case of $UO_2$ fuel, a less magnitude of enrichment grade is beneficial, in the case of MOX nuclear fuel, a large magnitude of enrichment grade is beneficial. Thus, the foregoing fuel assembly available in the prior art is involved with a drawback wherein the production cost thereof is considerably large.
2. Production of plural kinds requires a cost larger than that for production of a single kind. Thus, the nuclear fuel assembly having many kinds of MOX nuclear fuel rods each of which kinds has plural fissionable Pu-s enrichment grades different from one another, is disadvantageous from the economical viewpoints.
3. Although the spent fuel of $UO_2$ fuel rods is valuable, the spent fuel of the MOX fuel rods has a lesser value for use the material as a nuclear fuel, because absorption of neutron by $UO_2$ produces $Pu^{239}$, $Pu^{240}$, $Pu^{241}$ and $Pu^{242}$ including the fissionable $Pu^{239}$ and $Pu^{241}$, absorpotion of neutron by the MOX nuclear fuel produces only Pu-s having a higher order most of which are non-fissionable $Pu^{240}$ and $Pu^{242}$. Since the foregoing nuclear fuel assembly available in the prior art uses many MOX nuclear fuel rods, a resulting drawback is that much of the spent fuel has a lesser value.

SUMMARY OF THE INVENTION

The object of this invention is to remove the foregoing drawbacks and to provide an improvement applicable to a nuclear fuel assembly employable either for a thermal neutron reactor designed to employ $UO_2$ as the nuclear fuel and light water as the moderator/coolant or for a thermal neutron reactor designed to employ the MOX nuclear fuel as the nuclear fuel and light water as the moderator/coolant, wherein the production cost thereof is less expensive and the spent fuel thereof is more valuable than the spent fuel of a nuclear fuel assembly employable for a reactor designed burning either $UO_2$ fuel or the MOX fuel available in the prior art.

For the purpose to achieve the foregoing objects, a nuclear fuel assembly employable either for a thermal neutron reactor employing $UO_2$ as the nuclear fuel and light water as the moderator/coolant or for a thermal neutron reactor employing the MOX nuclear fuel as the nuclear fuel and light water as the moderator/coolant in accordance with this invention is designed, based on the philosophy entirely different from that of the prior art.

The philosophy specific for the nuclear fuel assembly of this invention will be summarized below.

1. Only one kind of MOX nuclear fuel rods or MOX nuclear fuel rods having only one magnitude of enrichment grade of the fissionable Pu-s is employed.
2. The enrichment grade of the fissionable Pu-s contained in the only one kind of the MOX fuel rods is selected to be much higher than that of the fissionable Pu-s contained in the MOX fuel rods of the nuclear fuel assemblies available in the prior art.
3. The total quantity of the MOX nuclear fuel rods is selected to be much less than that of the prior art.
4. The burn-up obtained by the total quantity of the MOX nuclear fuel rods is identical to or larger than that of the prior art.

More specifically, the magnitude of the enrichment grade of the fissionable Pu-s or $Pu^{239}$ and $Pu^{241}$ of the only one kind of the MOX nuclear fuel rods varies 5 through 15 weight %, more preferably 10 through 15 weight %, with respect to that of the entire volume of Pu-s including the fissionable and non-fissionable Pu-s, and the quantity of the MOX nuclear fuel rods with respect to the total quantity of the entire fuel rods, varies 20 through 40%, more preferably 20 through 25%.

The function and advantages of this invention will be described below.

Firstly, as was described earlier, the raw material of the MOX nuclear fuel is Pu-s recovered from the spent fuel of $UO_2$ fuel which was burnt in a reactor, and the recovered Pu-s contain 60 through 70% of the fissionable Pu-s or $Pu^{239}$ and $Pu^{241}$. Since the MOX nuclear fuel having such a high enrichment grade can not be acceptable by a thermal reactor, reduction of the enrichment grade is essential for production of a MOX nuclear fuel rod. Thus, the cost for producing a MOX nuclear fuel rod containing a less quantity of the fissionable Pu-s or having a less magnitude of enrichment grade is more expensive than the cost for producing a MOX nuclear fuel rod containing a larger quantity of the fissionable Pu-s or having a larger magnitude of enrichment grade. Thus, the less the enrichment grade is, the more the production cost is, for a MOX nuclear fuel. In contrast, the raw material of the $UO_2$ fuel is the natural U containing quite small quantity or 0.7% of the fissionable $U^{235}$. Thus, the more the enrichment grade is, the more the production cost is, for a $UO_2$ fuel. For the purpose to reduce the production cost of a MOX nuclear fuel rod, MOX fuel having a fairly higher enrichment grade are employed for the nuclear fuel assembly of this invention. As a result, the production cost of the nuclear fuel assembly of this invention is less expensive than the prior art.

Secondly, it is quite natural that the production cost of nuclear fuel assemblies employable for a reactor is inclined to increase following an increase in the quantity of kinds of the nuclear fuel rods. In other words, mass production of only one kind of a product is more economical than production of many different kinds of products. Since the kind of the MOX fuel rods employed in the nuclear fuel assembly of this invention is only one, it is clear that the production cost of the nuclear fuel assembly of this invention is less expensive than the prior art.

Thirdly, since the total quantity per hour of neutrons required to be emitted in a reactor is predetermined for the specific reactor, an increase in the enrichment grade of the MOX nuclear fuel results in a reduction in the quantity of the MOX nuclear fuel rods. By this reason, the quantity of the MOX nuclear fuel rods of this invention is reduced. This resultantly causes an advantage to reduce the quantity of the spent fuel of which the value is much less. An increase in the enrichment grade of a small quantity of the MOX rods is accompanied by a possibility of causing a local peaking problem. Thus, the magnitude of the enrichment grade of the MOX rods employed in the nuclear fuel assembly of this invention is determined, paying a serious attention not to cause the local peaking problem.

Fourthly, referring to a drawing, the reason why the value of the spent fuel of this invention is larger than that of the spent fuel of the prior art, will be described below.

The reason why the value of the spent fuel of the MOX nuclear fuel is less for use the material as a nuclear fuel will be discussed below.

FIG. 3 illustrates the cross-section of $U^{235}$ and $Pu^{239}$, $Pu^{240}$, $Pu^{241}$ and $Pu^{242}$. The cross-section of the fission of $U^{235}$ is large in the energy range corresponding to the thermal neutron range (low energy range) and small in the higher energy range. In contrast, the neutron absorption cross-section of $Pu^{239}$, $Pu^{240}$, $Pu^{241}$ and $Pu^{242}$ is large in the epi-thermal neutron range (high energy range), due to the resonance absorption peak recognized in the high energy range. This means that although a considerable quantity of neutrons encountering $U^{235}$ have much possibility to cause fission, most quantity of neutrons encountering $Pu^{239}$, $Pu^{240}$, $Pu^{241}$ and $Pu^{242}$ are absorbed by them to simply increase the order of the Pu-s.

This phenomenon can be accounted for by Table 1 comparing Pu composition contained in the MOX fuel assembly (Pu composition of the total quantity of Pu-s contained in a MOX fuel assembly) before being burnt in a reactor and Pu composition contained in the MOX fuel assembly (Pu composition of the total quantity of Pu-s contained in a MOX fuel assembly) after being burnt in a reactor.

TABLE 1

| Pu composition contained in the MOX fuel assembly before and after being burnt in a reactor. | | |
|---|---|---|
| | Before being burnt | After being burnt |
| $Pu^{238}$ | 2% | 3% |
| $Pu^{239}$ | 59% | 31% |
| $Pu^{240}$ | 27% | 37% |
| $Pu^{241}$ | 8% | 16% |
| $Pu^{242}$ | 4% | 13% |

The table shows the reduction of the sum of $Pu^{239}$ and $Pu^{241}$ (reduction from 67% to 47%) is considerably large. This means the comparative quantity of sum of $Pu^{239}$ and $Pu^{241}$ with respect to the entire quantity of Pu isotopes contained in the spent fuel of the MOX fuel assembly is small.

On the other hand, insofar as the comparative quantity of sum of $Pu^{239}$ and $Pu^{241}$ with respect to the entire quantity of Pu isotopes contained in each fuel rod is concerned, the situation is different. Namely, Table 2 (Pu composition contained in a $UO_2$ fuel rod after being burnt and a MOX fuel rod after being burnt in a reactor) shows that although the comparative quantity of sum of $Pu^{239}$ and $Pu^{241}$ with respect to the entire quantity of Pu isotopes contained in the spent fuel of a $UO_2$ fuel rod is 68%, the comparative quantity of sum of $Pu^{239}$ and $Pu^{241}$ with respect to the entire quantity of Pu isotopes contained in the spent fuel of a MOX fuel rod is 39%.

TABLE 2

Pu composition contained in a $UO_2$ fuel rod and a MOX fuel rod after being burnt in a reactor.

| | Pu composition contained in $UO_2$ fuel rod after being burnt in a reactor | Pu composition contained in the MOX fuel rod after being burnt in a reactor |
|---|---|---|
| $Pu^{238}$ | 2% | 2% |
| $Pu^{239}$ | 55% | 22% |
| $Pu^{240}$ | 24% | 43% |
| $Pu^{241}$ | 13% | 17% |
| $Pu^{242}$ | 6% | 16% |

This means that however a MOX fuel rod reduces its value by being burnt in a reactor, a $UO_2$ fuel keeps its value even after it was burnt in a reactor by the following reasons.

1. A MOX fuel rod is required to contain a specific quantity of fissionable Pu isotopes. If the comparative quantity of sum of $Pu^{239}$ and $Pu^{241}$ with respect to the entire quantity of Pu isotopes contained in a MOX fuel rod is less, it needs a larger quantity of fissionable and non-fissionable Pu isotopes. Since non-fissionable Pu isotopes emit α ray as well, a larger magnitude of radioactive confinement will be required for establishments of spent fuel reprocessing units which will be employed later.
2. Since $Pu^{240}$ has a large cross-section for absorption of neutrons, an increase in the quantity of $Pu^{240}$ requires an increase in the quantity of fissionable Pu isotopes.
3. Since $Pu^{240}$ produces $Pu^{241}$ which is fissionable, this phenomenon resultantly increases the future potential magnitude of fission. This resultantly causes a complicated problem for designing a reactor in long term viewpoints.

Since the MOX fuel assembly of this invention has a rather small quantity of MOX fuel rods containing a fairly large quantity of fissionable Pu-s, the MOX fuel assembly resultantly has a large quantity of $UO_2$ fuel rods. Thus, the spent fuel of the MOX fuel assembly of this invention contains large volume of fissionable Pu-s. In this sense, the spent fuel of the MOX fuel assembly of this invention is valuable from the viewpoints of using the material as the fuel of a nuclear reactor.

BRIEF DESCRIPTION OF THE DRAWINGS

This invention, together with its various features and advantages, can be readily understood from the following more detailed description presented in conjunction with the following drawing, in which.

DETAILED DESCRIPTION OF THE PREFERRED EMBODIMENTS

A detailed description will be presented below for a nuclear fuel assembly designed to be employable either for a $UO_2$/light water reactor or for a MOX nuclear fuel/light water reactor in accordance with three independent embodiments of this invention.

First Embodiment

Figure 1:
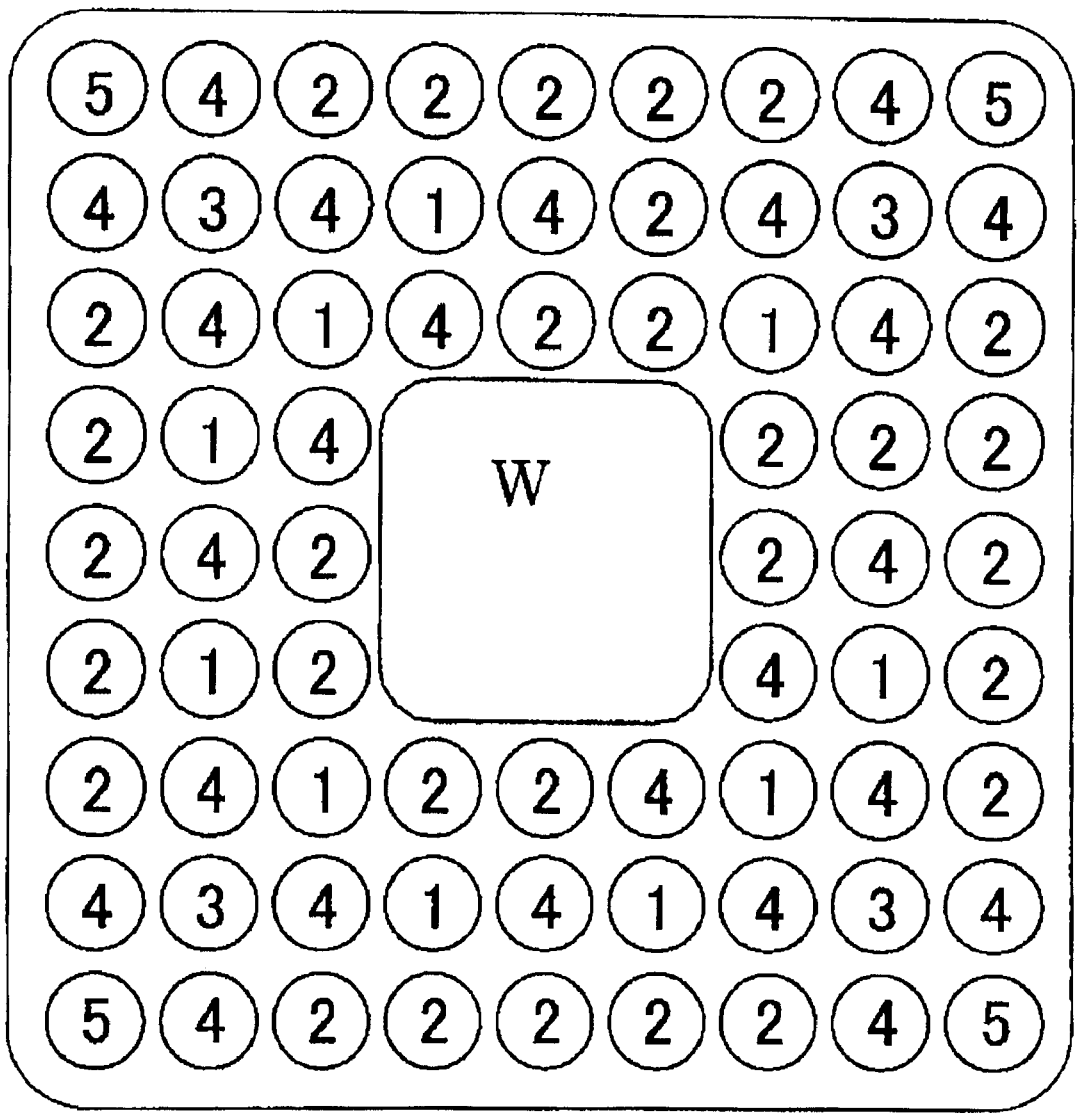
FIG. 1 is a horizontal cross-section of a nuclear fuel assembly designed to be employable for a $UO_2$/light water reactor available in the prior art.
Figure 2:
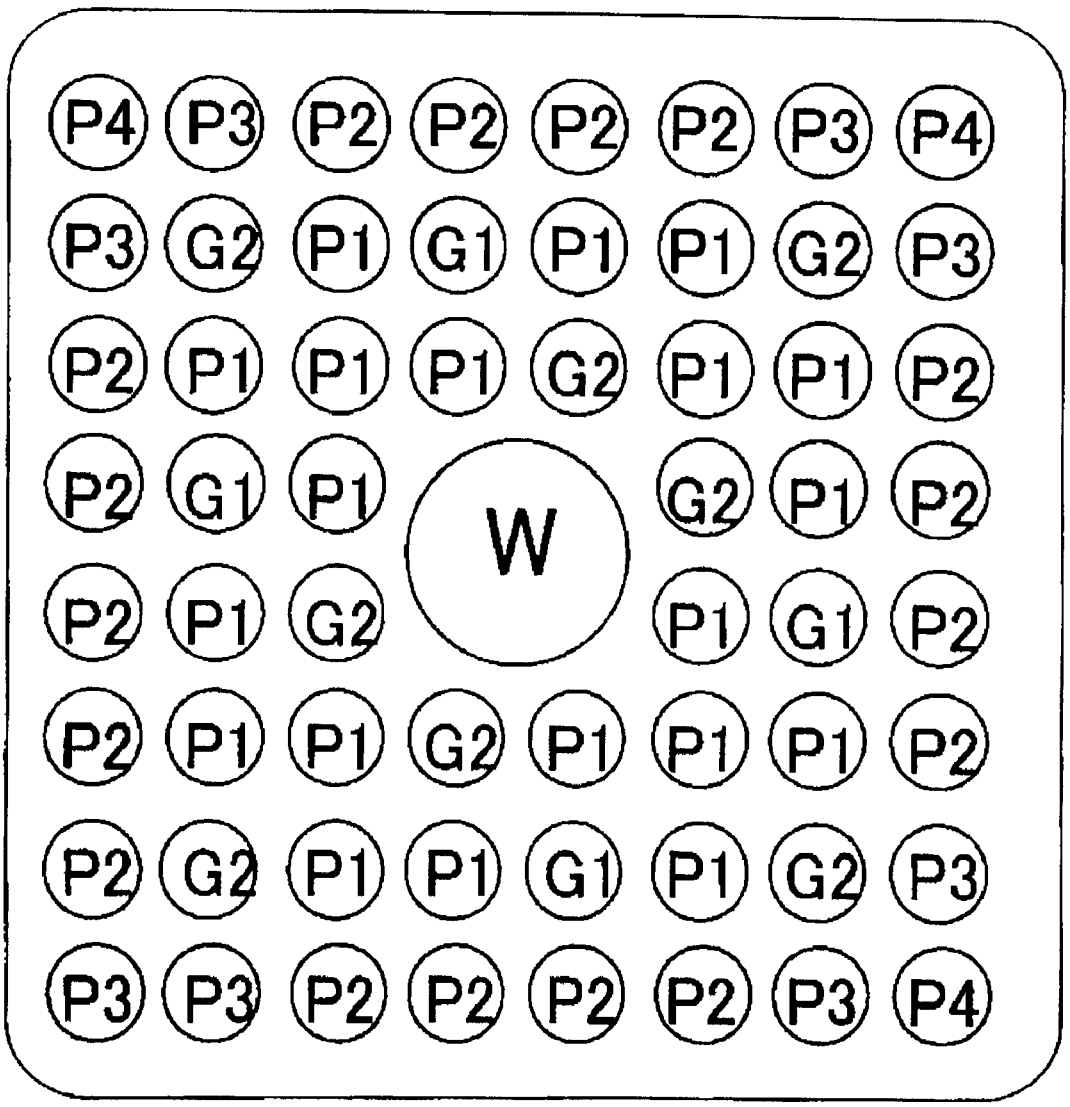
FIG. 2 is a horizontal cross-section of a nuclear fuel assembly designed to be employable either for a $UO_2$/light water reactor or for a MOX nuclear fuel/light water reactor available in the prior art.
Figure 3:
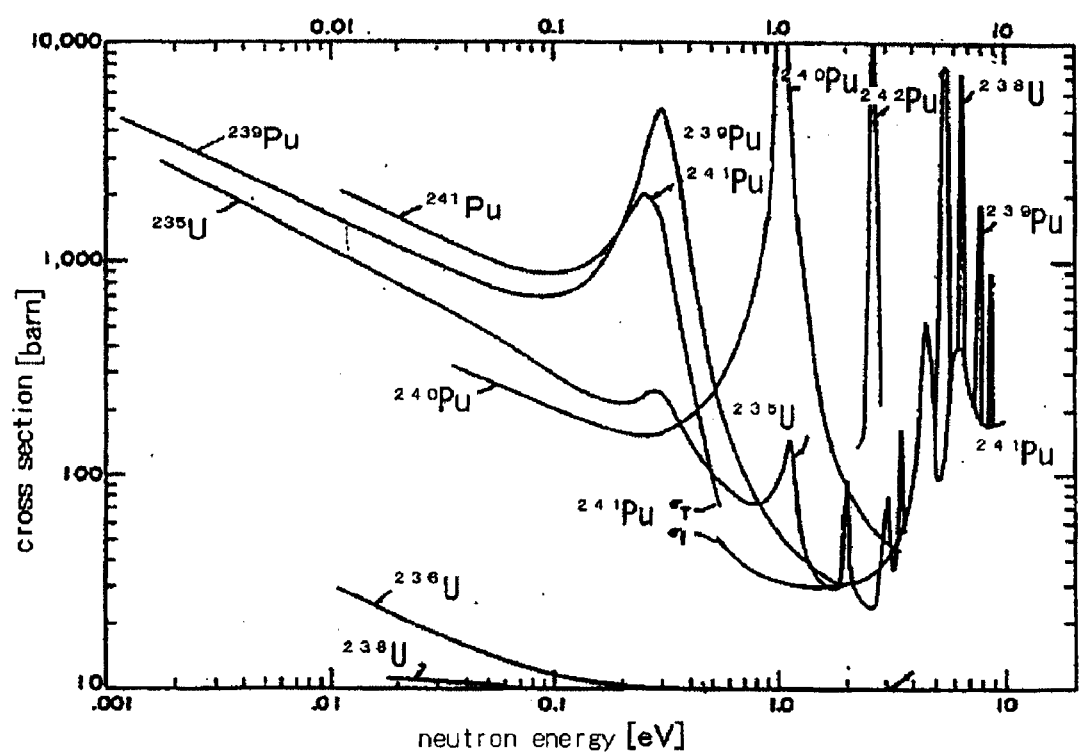
FIG. 3 is a chart showing the relations between the neutron absorption cross-section of $U^{235}$ and $Pu^{239}$, $Pu^{240}$, $Pu^{241}$ and $Pu^{242}$ and the neutron energy (temperature)
Figure 4:
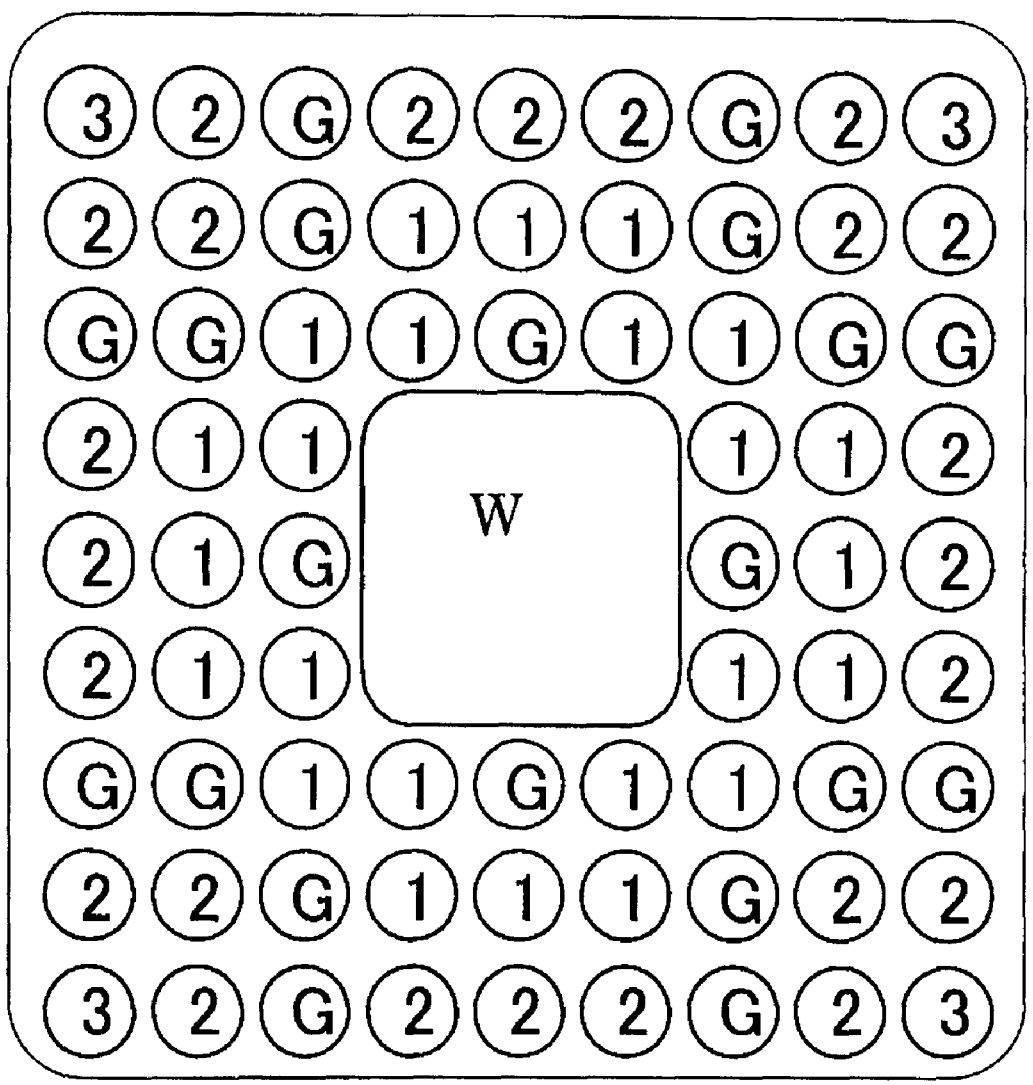
FIG. 4 is a horizontal cross-section of a nuclear fuel assembly designed to be employable either for a $UO_2$/light water reactor or for a MOX nuclear fuel/light water reactor in accordance with the first embodiment of this invention.

Referring to FIG. 4, an exemplary arrangement of nuclear fuel rods in a nuclear fuel assembly designed to be employable for a thermal reactor which is allowed to employ either $UO_2$ fuel or MOX nuclear fuel in accordance with the first embodiment of this invention, will be described below.

A thermal reactor currently in operation in any country in the world is required to observe the laws and regulations regarding the length of operation cycle thereof and the burn-up thereof, effective in the specific country in which the specific reactor is operating. Thus, possibilities exist that the entire requirements of this invention may not be allowed. In the first embodiment, however, a serious attention is paid to realize the feature and advantages of this invention as much as possible independently from the current legal restriction. In other words, the MOX enrichment grade of the only one kind of MOX nuclear fuel rods is selected as high as 14 weight % and the ratio of the quantity of the MOX rods with respect to the total quantity of the nuclear fuel rods, is selected to be as low as 33%.

Referring to FIG. 4 illustrating a horizontal cross-section of a nuclear fuel assembly in accordance with the first embodiment of this invention, the assembly having MOX nuclear fuel rods and $UO_2$ rods and having a burn-up capacity of 70 GWd/ton (heavy metal mass ton), symbol 1 shows highly enriched MOX nuclear fuel rods each of which contains $U^{235}$ in 0.225 weight % and the fissionable Pu-s or $Pu^{239}$ and $Pu^{241}$ in approximately 14 weight %. The quantity employed is 24. This is the only one kind of MOX nuclear fuel rods employed for this assembly. Symbols 2 and 3 show $UO_2$ rods each of which kinds contains $U^{235}$ in 4.9 weight % and 4.5 weight % respectively. The quantity employed is 24 and 4 respectively. Symbol G shows gadolinium rods each of which contains $U^{235}$ in 3.5 weight % and gadolinium in 3.5 weight % respectively. The quantity employed is 20. Thus, the MOX nuclear fuel rods accounts for 33% of the total quantity of the nuclear fuel rods contained in the nuclear fuel assembly. Each rod is approximately 4 m in length and approximately 11 mm in the external diameter. The nuclear fuel assembly is a square of which the length of each side is approximately 15 cm.

The production process of the foregoing nuclear fuel assembly in accordance with this invention is nearly identical to that which is presently available.

Firstly, Purex process or some other dry or wet spent nuclear fuel reprocessing processes are employed to separate Pu-s out of a spent fuel. The quantity of fissionable Pu-s or $Pu^{239}$ and $Pu^{241}$ contained in the separated Pu-s which usually is determined by a mass analysis process is 60 through 70%. An oxidation process is conducted to produce Pu-oxides.

Secondly, the powder of $PuO_2$ and $UO_2$ are mixed to make the resultant grade of enrichment to a desired value.

Thirdly, MINAS process or SBR process is conducted to well commingle the powder of $PuO_2$ and $UO_2$.

Molding and sintering process are conducted to convert the powder of $PuO_2$ and $UO_2$ to sintered pellets of $PuO_2$ and $UO_2$.

The product pellets are charged in a zircaloy sheath and the both ends thereof are sealed to produce fuel rods.

MOX fuel rods, $UO_2$ rods and other parts are fabricated to finish nuclear fuel assemblies.

As is illustrated in FIG. 4, only one kind of MOX fuel rods 1 of which the enrichment grade is as high as 14 weight % are arranged at the area at which the effects of the moderator are less. Since the rods represented by symbols 2 and 3 are $UO_2$ rods and since the rods represented by symbol 1 alone are MOX fuel rods, the ratio of the quantity of MOX fuel rods with respect to the total quantity of the nuclear fuel rods is as high as 33%. As a result, the grade of enrichment of 14 weight % is remarkably higher than that of the prior art of 5 weight %. On the other hand, the ratio (33%) of the quantity of the MOX fuel rods with respect to the total quantity of the nuclear fuel rods is remarkably less in comparison with that of the prior art or 80%. The function of the gadolinium fuel rods is identical to that of the prior art. Namely, it is to restrict fission to occur at the beginning of a reactor operation period. In other words, the gadolinium fuel rods are effective to reduce the possibility of fission to occur at the beginning of the reactor operation period but thereafter they lose the function and transit themselves to a fissionable fuel.

In conclusion, the nuclear fuel assembly in accordance with this embodiment is provided with only one kind of MOX nuclear fuel rods each of which has remarkably large magnitude of the enrichment grade of the fissionable Pu-s or $Pu^{239}$ and $Pu^{241}$, and the quantity of the MOX nuclear fuel rods is remarkably small.

As was described earlier, the production cost of this nuclear fuel assembly is much less and the value of the spent fuel of this nuclear fuel assembly is considerably large.

Second Embodiment

Figure 5:
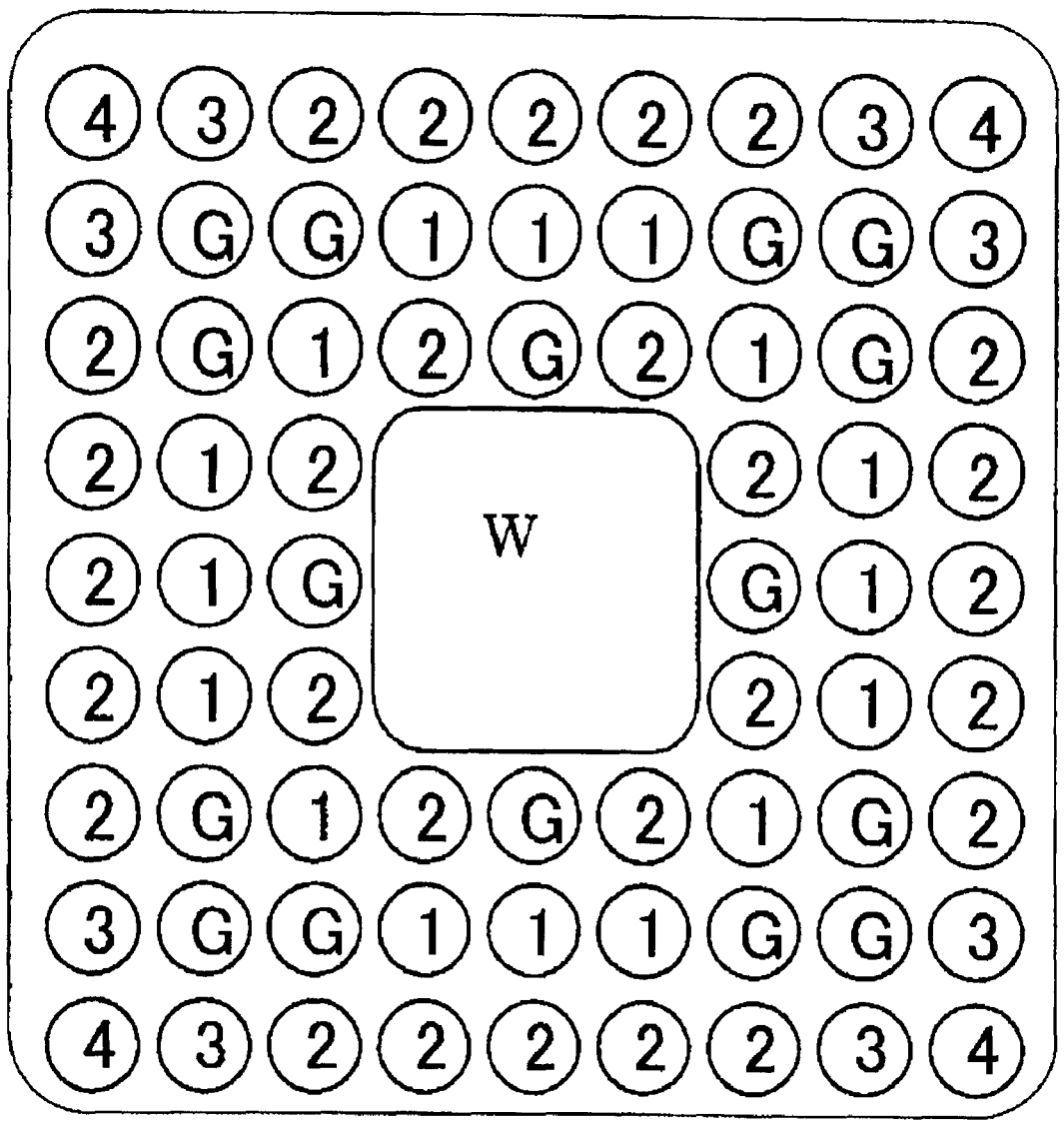
FIG. 5 is a horizontal cross-section of a nuclear fuel assembly designed to be employable either for a $UO_2$/light water reactor or for a MOX nuclear fuel/light water reactor in accordance with the second embodiment of this invention.

Referring to FIG. 5, an exemplary arrangement of nuclear fuel rods in a nuclear fuel assembly designed to be employable for a thermal reactor which is allowed to employ either $UO_2$ fuel alone or MOX nuclear fuel in accordance with the second embodiment of this invention, will be described below.

As was described earlier, a thermal reactor currently in operation in any country in the world is required to observe the laws and regulations regarding the length of operation cycle thereof and the burn-up thereof, effective in the specific country in which the specific thermal reactor is operating. In the second embodiment as well, however, a serious attention is paid to realize the feature and advantages of this invention as much as possible within the limitation to observe the legal restriction presently effective generally in the world. In other words, the MOX enrichment grade is selected to be 6 weight % and the ratio of the quantity of the MOX rods with respect to the total quantity of the nuclear fuel rods, is selected to be 25%.

Referring to FIG. 5 illustrating a horizontal cross-section of a nuclear fuel assembly in accordance with the second embodiment of this invention, the assembly having MOX nuclear fuel rods and $UO_2$ nuclear fuel rods and a burn-up capacity of 45 GWd/ton (heavy metal mass ton), symbol 1 shows highly enriched MOX nuclear fuel rods each of which kinds contains $U^{235}$ in 0.225 weight % and the fissionable Pu-s or $Pu^{239}$ and $Pu^{241}$ in 6 weight %. The quantity employed is 16. This is the only one kind of MOX nuclear fuel rods employed for this assembly. Symbols 2, 3 and 4 show $UO_2$ fuel rods each of which kinds contains $U^{235}$ in 4.0 weight %, 3.5 weight % and 3 weight % respectively. The quantity employed is 28, 8 and 4 respectively. Symbol G shows gadolinium rods each of which contains $U^{235}$ in 2 weight % and gadolinium in 2 weight % respectively. The quantity employed is 16. Thus, the MOX nuclear fuel rods accounts for 25% of the total quantity of the nuclear fuel rods employed in the nuclear fuel assembly.

The production process of the foregoing nuclear fuel assembly in accordance with this embodiment is entirely identical to that for the first embodiment.

As is illustrated in FIG. 5, only one kind of MOX fuel rods 1 of which kind the enrichment grade is 6 weight % are arranged at the area at which the effects of the moderator are less. Since the rods represented by symbols 2, 3 and 4 are $UO_2$ fuel rods and since the rods represented by symbol 1 alone are MOX fuel rods, the ratio of the quantity of MOX fuel rods with respect to the total quantity of the nuclear fuel rods is 25%. As a result, the grade of enrichment of 6 weight % is higher than that of the prior art or 5%. On the other hand, the ratio (25%) of the quantity of the MOX fuel rods with respect to the total quantity of the nuclear fuel rods is remarkably less than that of the prior art or 80%. The function of the gadolinium fuel rods is identical to that of the prior art. Namely, it is to restrict fission to occur at the beginning of the reactor operation period.

In conclusion, the nuclear fuel assembly in accordance with this embodiment is provided with only one kind of MOX nuclear fuel rods each of which only one kind has large magnitude of the enrichment grade of the fissionable Pu-s or $Pu^{239}$ and $Pu^{241}$, and the quantity of the MOX nuclear fuel rods is small.

As was described earlier, the production cost of this nuclear fuel assembly is much less and the value of the spent fuel of this nuclear fuel assembly is considerably large.

Third Embodiment

Figure 6:
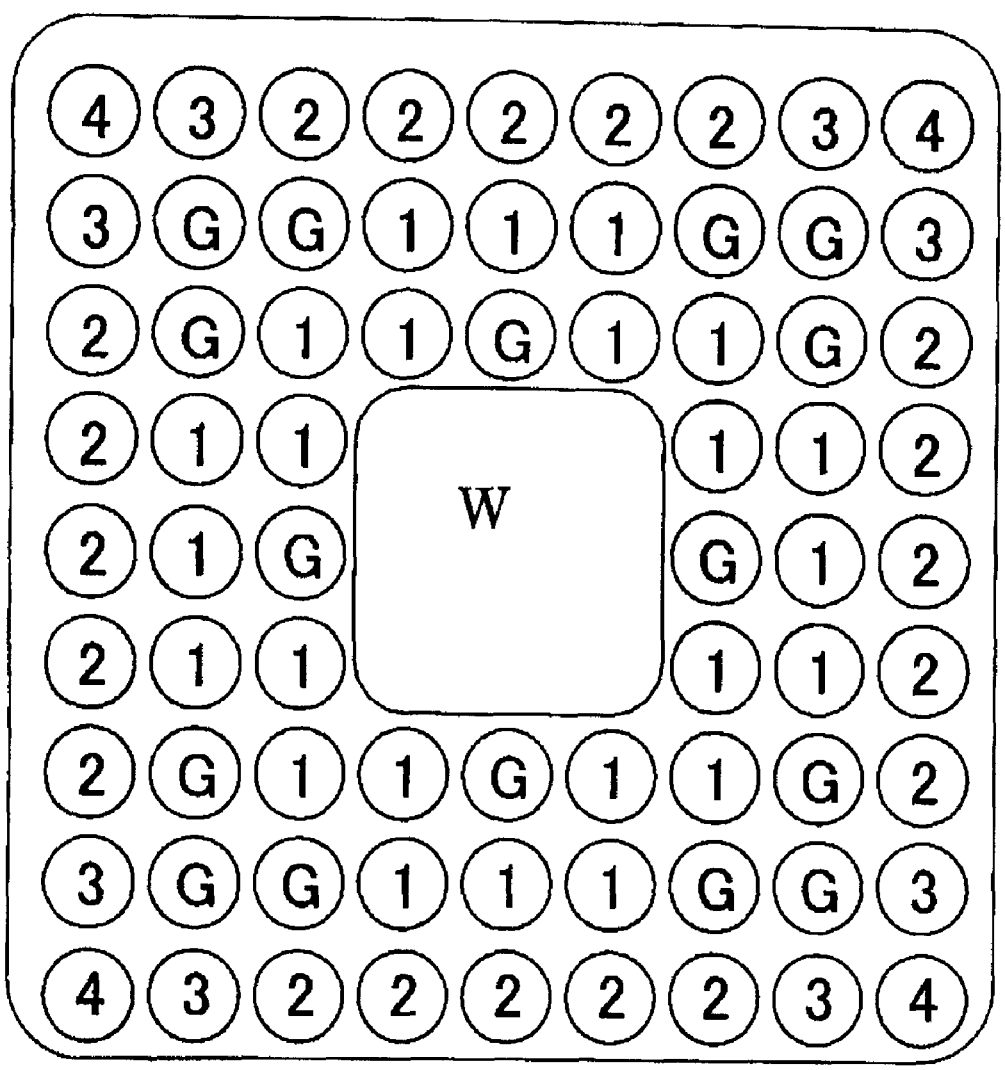
FIG. 6 is a horizontal cross-section of a nuclear fuel assembly designed to be employable either for a $UO_2$/light water reactor or for a MOX nuclear fuel/light water reactor in accordance with the third embodiment of this invention.

Referring to FIG. 6, an exemplary arrangement of nuclear fuel rods in a nuclear fuel assembly designed to be employable for a thermal reactor which is allowed to employ either $UO_2$ fuel alone or MOX nuclear fuel in accordance with the third embodiment of this invention, will be described below.

As was described earlier, a thermal reactor currently in operation in any country in the world is required to observe the laws and regulations regarding the length of operation cycle thereof and the burn-up thereof, effective in the specific country in which the specific thermal reactor is presently operating. In the third embodiment, the best efforts are used to realize the feature and advantage of this invention as much as possible within the limitation of the design of the presently operating reactor.

Referring to FIG. 6 illustrating a horizontal cross-section of a nuclear fuel assembly in accordance with the third embodiment of this invention, the assembly having MOX fuel rods and $UO_2$ fuel rods and having a burn-up capacity of 45 GWd/ton (heavy metal mass ton), symbol 1 shows highly enriched MOX nuclear fuel rods each of which contains $U^{235}$ in 0.225 weight % and the fissionable Pu-s or $Pu^{239}$ and $Pu^{241}$ in 6 weight %. The quantity employed is 24. This is the only one kind of the MOX nuclear fuel rods employed for this assembly. Symbols 2, 3 and 4 show $UO_2$ fuel rods each of which kinds contains $U^{235}$ in 4 weight %, 3.5 weight % and 3 weight % respectively. The quantity employed is 20, 8 and 4 respectively. Symbol G shows gadolinium rods each of which contains $U^{235}$ in 2 weight % and gadolinium in 2.2 weight % respectively. The quantity employed is 16. Thus, the quantity of the MOX nuclear fuel rods accounts for 33% of the total quantity of the nuclear fuel rods employed in the assembly.

The production process of the foregoing nuclear fuel assembly in accordance with this embodiment is entirely identical to that for the first and second embodiments.

As is illustrated in FIG. 6, only one kind of MOX fuel rods 1 of which only one kind the enrichment grade is 6 weight % are arranged at the area at which the effects of the moderator are less. Since the rods represented by symbols 2, 3 and 4 are $UO_2$ fuel rods and since the rods represented by symbol 1 alone are the MOX fuel rods, the ratio of the quantity of the MOX fuel rods with respect to the total quantity of nuclear fuel rods is 33%. As a result, the grade of enrichment of 6 weight % is higher than that of the prior art or 5%. On the other hand, the ratio (33%) of the quantity of the MOX fuel rods with respect to the total quantity of the nuclear fuel rods is remarkably less than that of the prior art or 80%. The function of the gadolinium fuel rods is identical to that of the prior art.

As is identical to the first and second embodiments, the production cost of this nuclear fuel assembly is much less and the value of the spent fuel of this nuclear fuel assembly is considerably large.

In conclusion, the nuclear fuel assembly in accordance with this embodiment is provided with only one kind of MOX nuclear fuel rods each of which only one kind has relatively large magnitude of the enrichment grade of the fissionable Pu-s or $Pu^{239}$ and $Pu^{241}$, and the quantity of the MOX nuclear fuel rods is small.

As was described earlier, the production cost of this nuclear fuel assembly is much less and the value of the spent fuel of this nuclear fuel assembly is considerably large.

The above description has clarified that this invention has successfully provided an improvement applicable to a nuclear fuel assembly employable either for a thermal neutron reactor employing $UO_2$ as the nuclear fuel and light water as the moderator/coolant or for a thermal neutron reactor employing the MOX nuclear fuel as the nuclear fuel and light water as the moderator/coolant, wherein the production cost is much less and the value of the spent fuel thereof is much larger than that of the nuclear fuel assembly available in the prior art.

What is claimed is:

1. A mixed oxide nuclear fuel assembly employable for a thermal neutron/light water reactor comprising:
    a plurality of nuclear fuel rods arranged in a matrix in a channel box and means to allow flowing light water acting as both a moderator and a coolant in spaces between said nuclear fuel rods, said mixed oxide nuclear fuel assembly being positionable in a reactor core, wherein:
        20 through 40% of the quantity of said nuclear fuel rods are mixed oxide nuclear fuel rods, each of which contains fissionable plutoniums having only one kind of enrichment grade selected from a range of 5 through 15 weight %, and
        80 through 60% of the quantity of said nuclear fuel rods are $UO_2$ fuel rods containing U isotopes at least including $U^{235}$.

2. A mixed oxide nuclear fuel assembly employable for a thermal neutron/light water reactor in accordance with claim 1, wherein:
    20 through 25% of the quantity of said nuclear fuel rods are mixed oxide nuclear fuel rods.

3. A mixed oxide nuclear fuel assembly employable for a thermal neutron/light water reactor in accordance with claim 2, further comprising:
    a plurality of gadolinium rods containing U isotopes at least including $U^{235}$ and gadolinium, said gadolinium rods being positionable at an area where the effects of said moderator are strong.

4. A mixed oxide nuclear fuel assembly employable for a thermal neutron/light water reactor in accordance with claim 2, wherein:
    the enrichment grade of said $U^{235}$ is selected from a range of 1 through 5 weight %.

5. A mixed oxide nuclear fuel assembly employable for a thermal neutron/light water reactor in accordance with claim 2, wherein:
    said mixed oxide nuclear fuel rods are positionable at an area where the effects of said moderator are weak.

6. A mixed oxide nuclear fuel assembly employable for a thermal neutron/light water reactor in accordance with claim 2, further comprising:
    a water rod arranged in an area where effects of said moderator are weak.

7. A mixed oxide nuclear fuel assembly employable for a thermal neutron/light water reactor in accordance with claim 1, wherein:
    each of said mixed oxide nuclear fuel rods contains fissionable plutoniums having only one kind of enrichment grade selected from a range of 10 through 15 weight %.

8. A mixed oxide nuclear fuel assembly employable for a thermal neutron/light water reactor in accordance with claim 7, further comprising:
    a plurality of gadolinium rods containing U isotopes at least including $U^{235}$ and gadolinium, said gadolinium rods being positionable at an area where the effects of said moderator are strong.

9. A mixed oxide nuclear fuel assembly employable for a thermal neutron/light water reactor in accordance with claim 7, wherein:
    the enrichment grade of said $U^{235}$ is selected from a range of 1 through 5 weight %.

10. A mixed oxide nuclear fuel assembly employable for a thermal neutron/light water reactor in accordance with claim 7, wherein:
    said mixed oxide nuclear fuel rods are positionable at an area where the effects of said moderator are weak.

11. A mixed oxide nuclear fuel assembly employable for a thermal neutron/light water reactor in accordance with claim 7, further comprising:
    a water rod arranged in an area where effects of said moderator are weak.

12. A mixed oxide nuclear fuel assembly employable for a thermal neutron/light water reactor in accordance with claim 1, wherein:
    the enrichment grade of said $U^{235}$ is selected from a range of 1 through 5 weight %.

13. A mixed oxide nuclear fuel assembly employable for a thermal neutron/light water reactor in accordance with claim 12, further comprising:
    a plurality of gadolinium rods containing U isotopes at least including $U^{235}$ and gadolinium, said gadolinium rods being positionable at an area where the effects of said moderator are strong.

14. A mixed oxide nuclear fuel assembly employable for a thermal neutron/light water reactor in accordance with claim 12, further comprising:

a water rod arranged in an area where effects of said moderator are weak.

15. A mixed oxide nuclear fuel assembly employable for a thermal neutron/light water reactor in accordance with claim 1, wherein:

said mixed oxide nuclear fuel rods are positionable at an area where the effects of said moderator are weak.

16. A mixed oxide nuclear fuel assembly employable for a thermal neutron/light water reactor in accordance with claim 15, further comprising:

a plurality of gadolinium rods containing U isotopes at least including $U^{235}$ and gadolinium, said gadolinium rods being positionable at an area where the effects of said moderator are strong.

17. A mixed oxide nuclear fuel assembly employable for a thermal neutron/light water reactor in accordance with claim 15, wherein:

the enrichment grade of said $U^{235}$ is selected from a range of 1 through 5 weight %.

18. A mixed oxide nuclear fuel assembly employable for a thermal neutron/light water reactor in accordance with claim 15, further comprising:

a water rod arranged in an area where effects of said moderator are weak.

19. A mixed oxide nuclear fuel assembly employable for a thermal neutron/light water reactor in accordance with claim 1, further comprising:

a plurality of gadolinium rods containing U isotopes at least including $U^{235}$ and gadolinium, said gadolinium rods being positionable at an area where the effects of said moderator are strong.

20. A mixed oxide nuclear fuel assembly employable for a thermal neutron/light water reactor in accordance with claim 1, further comprising:

a water rod arranged in an area where effects of said moderator are weak.

* * * * *

UNITED STATES PATENT AND TRADEMARK OFFICE
CERTIFICATE OF CORRECTION

PATENT NO.    : 6,658,078 B2
DATED         : December 2, 2003
INVENTOR(S)   : Takafumi Anegawa et al.

It is certified that error appears in the above-identified patent and that said Letters Patent is hereby corrected as shown below:

<u>Title page,</u>
Insert:

-- [30]    Foreign Application Priority Data

Japanese Patent Application No. 2001-22708 filed July 23, 2001 --.

Signed and Sealed this

Sixteenth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,658,078 B2  
DATED : December 2, 2003  
INVENTOR(S) : Takafumi Anegawa et al.

It is certified that error appears in the above-identified patent and that said Letters Patent is hereby corrected as shown below:

<u>Title page,</u>  
Insert:

-- [30]    Foreign Application Priority Data

Japanese Patent Application No. 2001-221708 filed July 23, 2001 --.

This certificate supersedes Certificate of Correction issued March 16, 2004.

Signed and Sealed this

Fifteenth Day of February, 2005

JON W. DUDAS  
*Director of the United States Patent and Trademark Office*